Aug. 2, 1966   J. P. LOMBARDI   3,263,321
METHOD AND MACHINE FOR MAKING SPIRAL SEAMED PIPE
Filed March 12, 1964   2 Sheets-Sheet 1
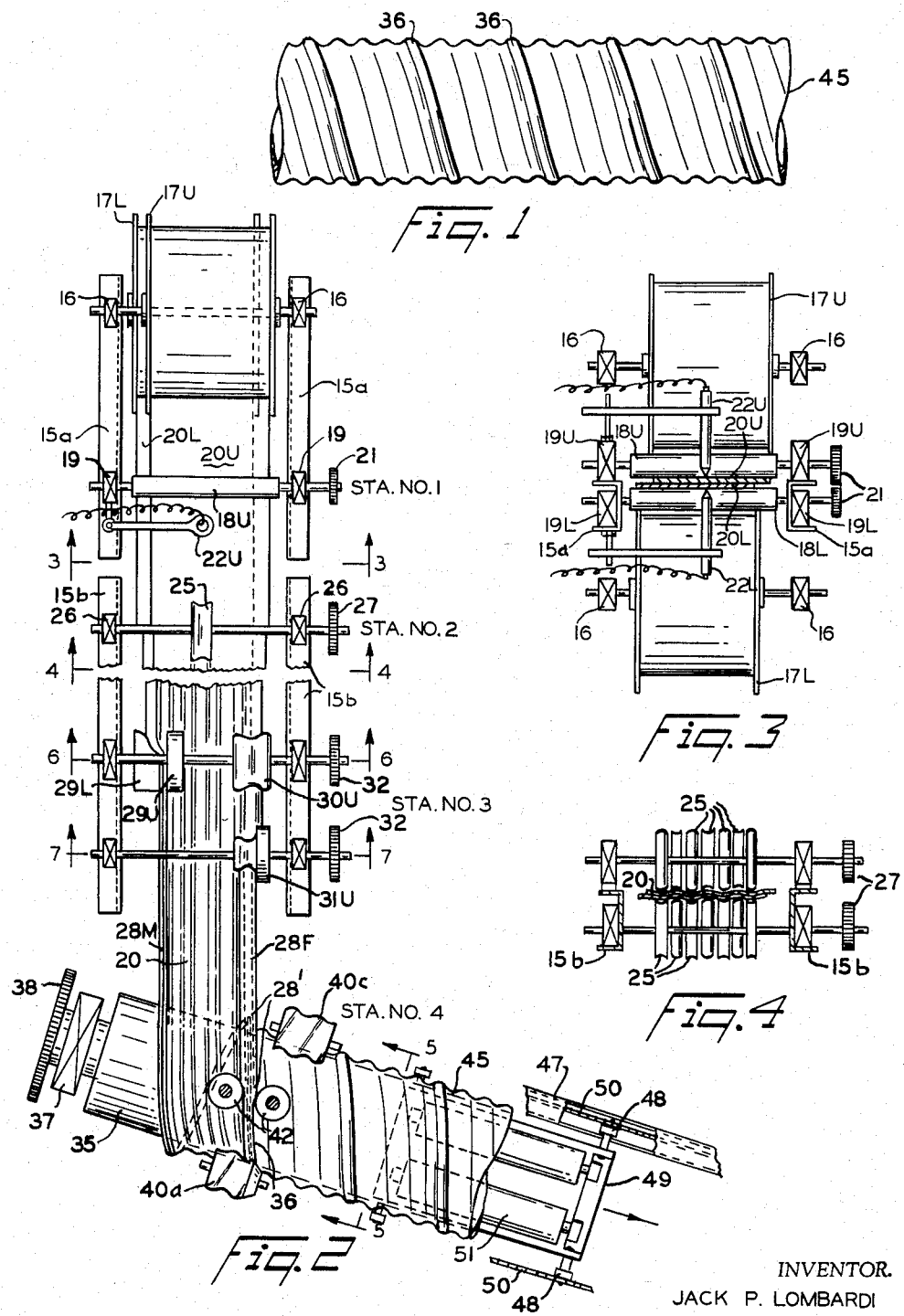
INVENTOR.
JACK P. LOMBARDI
BY Aug. 2, 1966  J. P. LOMBARDI  3,263,321

METHOD AND MACHINE FOR MAKING SPIRAL SEAMED PIPE

Filed March 12, 1964  2 Sheets-Sheet 2

INVENTOR.
JACK P. LOMBARDI
BY Richard von K. Bruns
Atty.

United States Patent Office 3,263,321
Patented August 2, 1966

3,263,321
METHOD AND MACHINE FOR MAKING SPIRAL SEAMED PIPE
Jack P. Lombardi, Duguid Road, Manlius, N.Y.
Filed Mar. 12, 1964, Ser. No. 351,352
6 Claims. (Cl. 29—429)

This invention relates to a method and machine for making laminated sheet metal pipe, and more particularly to such pipe having a spiral double-lock seam and to a continuous method for making the same.

In the manufacture of relatively large pipe, as for example drainage and piling pipe, it has been necessary to use heavy gauge metal in the fabrication of the pipe and to weld or bolt the seams. Lighter gauge sheet metal may be used to make pipe of comparable strength by making the pipe in two or more layers, but such laminated pipe has been unavailable heretofore because of the difficulty of fabricating the pipe in a single continuous operation and forming a practical lock seam.

It is the principal object of the present invention, accordingly, to provide a machine and method for fabricating laminated sheet metal pipe having a spiral lock seam.

Another important object is to provide a method and machine for making laminated sheet metal corrugated pipe having a spiral double-lock seam and which has sufficient strength for use as piling.

Still another object is to provide a means and method for forming spiral seamed corrugated pipe in a continuous manufacturing process.

A further object is to provide a method and machine for making laminated sheet metal pipe with a spiral lock-seam securing all layers together and having inner and outer layers of different physical properties.

A still further object is to provide a means and method for cold-rolling sheet metal into a corrugated spiral-seamed pipe in a continuous process.

Other objects and advantages will appear from the following description taken in conjunction with the accompanying drawings in which:

FIGURE 1 is a fragmentary side elevational view of a portion of a pipe section according to the invention;

FIGURE 2 is a fragmentary diagrammatic plan view of the machine for making the pipe shown in FIGURE 1;

Figure 5:
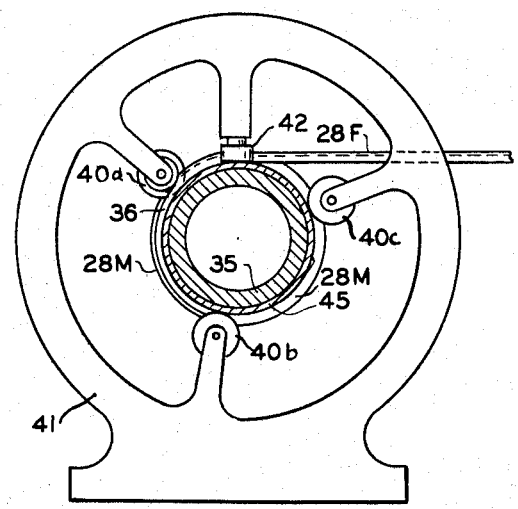
Figure 6:
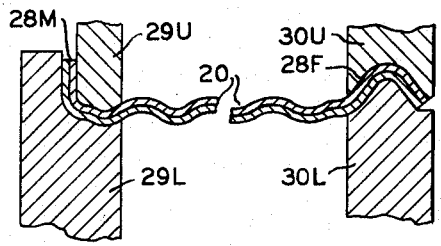
Figure 7:
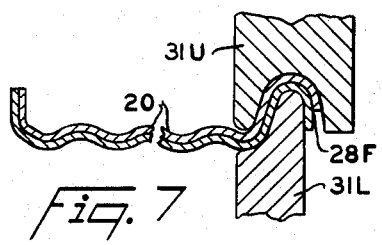
Figure 10:
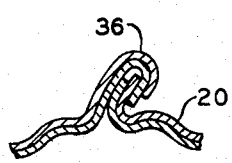
Figure 11:
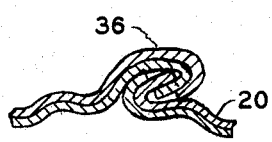
Figure 12:
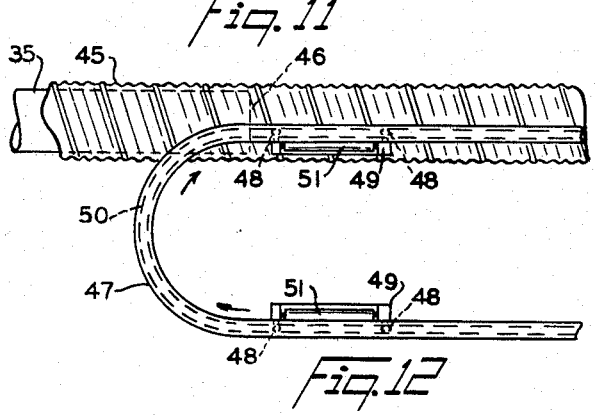

FIGURES 3, 4 and 5 are diagrammatic cross-sectional views on the lines 3—3, 4—4, and 5—5, respectively, of FIGURE 2;

FIGURES 6 and 7 are enlarged diagrammatic cross-sectional views of the corrugated web for making the pipe taken on the lines 6—6 and 7—7, respectively, of FIGURE 2;

FIGURES 8, 9, 10 and 11 are enlarged fragmentary cross-sectional views across the pipe seam at successive stages in forming the spiral seam on the mandrel of FIGURE 2; and FIGURE 12 is a fragmentary diagrammatic side elevational view of the pipe-supporting means at the free end of the mandrel of FIGURE 2.

Referring more particularly to FIGURES 2 and 3, Station No. 1 of the pipe forming machine comprises a supporting frame 15a on which are mounted, on suitable journal members 16, two reels 17U and 17L carrying rolls of strip sheet metal for forming the outer and inner layers of the web from which the pipe is formed. Two feed rolls 18U and 18L are provided, mounted in suitable journal members 19 carried on the frame 15a.

It should be noted that either the layer 20U or 20L, or both, may be perforated should the formation of such pipe be desired for drainage or other purposes.

The upper outer layer 20U is drawn from reel 17U and the lower web or inner layer 20L is drawn from reel 17L. An important feature of the invention is that layer 20U is offset laterally from layer 20L by offsetting the reels as shown or by drawing the layers from reels whose axes of rotation are inclined to that of the feed rolls 18. Each feed roll is provided with a gear 21 or other means for driving the rolls synchronously.

Another important feature is the provision of the two electrodes 22U and 22L supported on frame 15a in conventional manner forward of the feed rolls 18. The electrodes 22 are employed in conventional manner for tack welding or seam welding layers 20U and 20L together near the center of the web to secure the two layers together in their laterally offset relation. In FIGURES 2 and 3 the amount of this offset has been exaggerated for purposes of clarity, but it will be understood that, using about 18 gauge steel strips and for a web width of one to two feet, the offset is of the order of one-eighth inch.

From Station No. 1 the two-layered web 20 is drawn through the forming mill comprising Stations No. 2 and No. 3.

In FIGURE 2 a single corrugating roller 25 is shown supported in bearings 26 on frame 15b. It will be understood that Station No. 2 comprises a conventional corrugating mill having successive pairs of rollers 25 for corrugating web 20 between the side edges in the usual manner as indicated in FIGURE 4. Gears 27 or other means for driving the rollers 25 are provided.

It should be noted that the corrugations provided at Station No. 2 may be round, as shown, or square or peaked, as desired.

At Station No. 3, which may be part of the forming mill and rotatably supported on frame 15b, means are provided for forming locking hooks 28 on either side of the layered and corrugated web 20. A pair of rollers 29U and 29L are provided for bending up a layered flange or male locking hook 28M on one side of the web, and a pair of rollers 30U and 30L are provided for forming an inverted V-shaped flange on the opposite side of the web, the first step in forming a female hook 28F on this latter side. FIGURE 6 illustrates this step somewhat diagrammatically, the hook portions 28M and 28F being exaggerated in size for purposes of clarity.

Forward of rollers 29 and 30, another pair of locking-hook-forming rollers 31U and 31L completes the formation of the female locking hook 28F as best seen in FIGURE 7, the female hook being U-shaped and having its open end facing downward. Gears 32, or other conventional means, are provided for driving the hook forming rollers in the usual manner.

Forward of the forming mill, the web 20 is drawn forward to Station No. 4 which includes a mandrel 35 on which the web is helically wound and a lock seam 36 is formed and clinched. The mandrel 35 is rotatably supported (at the left end in FIGURE 2) in a suitable journal 37 and a gear 38 is provided at this end for driving the mandrel.

Figure 8:
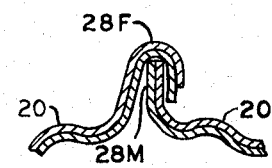

Mandrel 25 is disposed at such an angle to the forming mill and the advancing web 20 that the male locking hook 28M, after advancing almost a complete turn on the mandrel, enters and is engaged in the female locking hook 28F, as shown in FIGURE 8, as it approaches the mandrel. The line in which this engagement takes place is indicated at 28' in FIGURE 2.

A plurality of guide rollers 40, of which three are shown at 40a, 40b and 40c in FIGURE 5, are provided for guiding the web 20 around the mandrel as the web is helically wound thereon. A support 41, separate and independent of the mandrel 35, encircles the mandrel for rotatably supporting the rollers 40, as illustrated in FIGURE 5, and conventional means, not shown, are provided for driving at least some of the rollers 40 for reasons which will appear.

Figure 9:
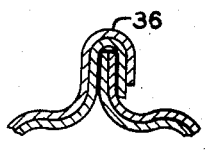

Mounted in support 41 at the top of mandrel 35 are a pair of driven pinch rolls 42, FIGURES 2 and 5. These are located on either side of the lock seam 36 for pinching the sides of the female hook 28F together into contact with the now interengaged male hook 28M, as indicated in FIGURE 9. Another roll 40a forward of the pinch rolls, which may conveniently be one of the guide rolls 40 as shown, is provided for bending over the now pinched-together lock seam to the position shown in FIGURE 10, the outer end of the female hook being bent over toward the adjacent web 20.

Forward of roller 40a, another roller 40b, which also may conveniently be another of the guide rollers 40, is provided for crushing or clinching the lock seam down against the web 20, as shown in FIGURE 11, for locking and sealing the seam.

Both roller 40a and 40b, as well as the third roll 40c, shown in FIGURES 2 and 5, are provided with a corrugated surface which meshes with the corrugations formed in the web 20. These corrugated rollers, being driven, continually force the fashioned pipe 45 to the right in FIGURE 2, axially of the mandrel 35, as the web 20 is helically wound on the mandrel.

Mandrel 35 terminates to the right of the portion shown in FIGURE 2 in a free end 46 (FIGURE 12) and the fashioned pipe is continually slid free of the mandrel at this free end. Means for supporting the fashioned pipe 45 and the free end 46 of mandrel 35 are shown in FIGURES 2 and 12.

Two endless tracks 47 support the wheels 48 of a succession of carts 49 which are pulled along the track in the direction of the arrows by means of a chain 50 connecting the carts. Each cart is provided with a pair of longitudinally disposed rollers 51 which cradle the finished pipe 45 and permit it to rotate as it is turned by the mandrel 35.

After the pipe has been withdrawn from the free end 46 of the mandrel it is cut into sections of the desired length by torch or otherwise. A portion of a section of the finished pipe 45 is shown in FIGURE 1.

The corrugated pipe 45 is particularly suited for driving into the ground to serve as supporting piling for a structure, or as culvert pipe for use in places where pipe of superior strength is needed.

In the operation of the machine and practice of the method described above, the feed rolls 18, the corrugating rollers 25, the hook forming rollers 29, 30, 31, the mandrel 35, the pinch rolls 42, and the guide and seam forming rollers 40 are all driven synchronously so that the pipe 45 is continuously and rapidly formed. The carts 49 are driven forward somewhat more rapidly than the pipe is formed on the mandrel so that when sections of the required length are cut from the end of the pipe they are separated from the remainder of the fabricated pipe on the mandrel and may be unloaded without interference with the fabricating operation.

The upper layer 20U of the web 20 is offset to the right of the lower, or inside layer as shown in FIGURE 2 so that when the male locking hook 28M is bent upward and the female hook 28F is given its reverse bend the two layers terminate along the same lines on either side of the web as shown in FIGURE 6. Further bending and locking of the seam 36 somewhat disturbs the coterminal relation of the ends but both layers are included in the finished locking seam. The slight displacement of the ends of the two layers at the ends of the hooks, shown in FIGURE 11, makes for a more compact and firmly compressed locking seam than if both layers ended at the same line in the seam. Each hook in the finished seam has at least one sharp edge of a layer compressed into an interlocking layer of the other hook.

The layers 20U and 20L of which the pipe is made are of comparatively thin sheet metal, 16 or 18 gauge for instance, which can be bent more easily than heavier gauge metal. The finished pipe, however, has a strength comparable to that made of the heavier metal because the layers are secured to each other and also to both layers of the adjacent turn of the spiral along the full length of the precisely controlled seam 36.

Accurate control of the ends of the interlocked layers at the finished seam 36 is made possible by the bonding or tacking together of the layers when they are first fed forward in the machine. During the forming operations at Stations No. 2 and 3, the predetermined offset relation of the two layers cannot be disturbed because the two layers are secured together. It will be apparent that the same technique may be used in forming laminated pipe having three or more layers.

The machine described above may also be used in the fabrication of unlaminated pipe using strips of thicker sheet metal, only one reel 17 being used and the bonding operation performed by the electrodes 22 being omitted.

The corrugating step at Station No. 2 may also be omitted as, for instance, in the fabrication of pipe having a thin inner layer of stainless steel or other chemically resistant metal and a thicker outer layer of more malleable or stronger metal. The lock seam 36 provides the pipe with a complete inner pipe surface of the chemically resistant metal. In the fabrication of such pipe in which an extremely thin inner layer is used, the two layers may be bonded together with an adhesive such as an epoxy cement rather than by welding as indicated in FIGURE 2.

For high pressure pipe, the joint at seam 36 may be welded either along or through the seam. While the description has generally referred to metal layers, it should be understood that the invention also contemplates laminations using a formable non-metallic material for one or more of the layers.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. A method of making laminated pipe comprising the steps: drawing more than one strip of formable sheet material from separate reels and feeding the strips one on top of the other to a forming mill with each strip laterally offset from the strip beneath a distance which is a small multiple of the thickness of the strips; securing the strips together along a line extending lengthwise of the strips to form a layered web; forming a male locking hook along one edge of the web and a female locking hook along the other edge thereof; guiding the hooked web around a mandrel which is disposed at an angle to the direction in which the web extends; winding the web helically on the mandrel and at the same time engaging the male hook at one side of the web in the female hook at the opposite side to form a helical lock seam; and at the same time continuously sliding the helically formed pipe axially along the mandrel.

2. A method of making corrugated laminated pipe comprising the steps: continuously laying two strips of sheet metal of equal width one upon the other with one strip laterally offset from the other a distance which is a small multiple of the thickness of the strips; bonding the two strips together along a line extending the length of the strips to form a two-layered web; corrugating the web; forming a male locking hook along one edge of the web and a female locking hook along the opposite edge, the male hook projecting from the web in a direction opposite to that in which the female hook faces; guiding the web around a rotating mandrel disposed at an angle to the direction in which the web extends; winding the web helically about the mandrel and at the same time engaging the male hook at one side of the web in the female hook at the opposite side; pinching the sides of the female hook together against the male hook to form a locking seam; bending the pinched-together seam over against the helically wound web and at the same time sliding the helically wound and locked pipe axially of the mandrel; and cutting the formed pipe into sections of desired length.

3. A method of making corrugated laminated pipe comprising the steps: continuously feeding strips of sheet metal of substantially equal width from two separate reels on to a forming mill so that one strip is positioned over and in parallel relation to the other and the upper strip is laterally offset from the lower strip a distance equal to a small multiple of the thickness of a single strip; bonding the two strips together along a line extending the length of the strips to form a two-layered web; corrugating the web on the forming mill; continuously forming a male locking hook along one edge of the web and a female locking hook along the opposite edge so that the male hook projects normal to the web in the direction opposite to that in which the open end of the female hook faces; guiding the web around a rotating mandrel disposed at an angle to the direction in which the web extends; winding the web helically about the mandrel so that the male hook at one side of the web engages in the female hook at the other side; pinching the sides of the female hook together in close contact with the male hook to form a locking seam; bending the pinched-together seam over toward the outer end of the female hook and against the helically wound web to lock the web into a formed pipe; at the same time sliding the formed pipe axially along the mandrel; and then cutting the formed pipe into sections of the required length.

4. A machine for forming sheet metal into a corrugated pipe having a helically extending lock seam, comprising: a forming mill; feed roll means for simultaneously and continuously feeding more than one sheet metal strip in overlying parallel relation to one another, each strip being laterally offset from the other strip a distance with is a small multiple of the thickness of the strips; means on the mill for corrugating the sheet metal strips longitudinally thereof; means on the mill for forming an upstanding male locking hook flange at one edge of the strips and a downwardly opening female locking hook at the other edge of the strips; a mandrel rotatably driven and supported at one end, said mandrel being disposed at an angle to said mill for receiving the corrugated strips from the mill and winding the strip helically thereon; means for guiding the strips around said mandrel; the mandrel being disposed at such an angle to the corrugated strips as it leaves the mill as to continuously engage the male hook along the one edge of the strips in the female hook along the opposite edge as the strips are wound on the mandrel; means for squeezing the female hook together against the male hook to form a lock seam; and means for rotatably supporting the formed pipe and the other end of the mandrel; said hook squeezing means being driven synchronously with said feed roll means and forming mill to continuously force the formed pipe off the mandrel.

5. A machine for forming sheet metal into a corrugated laminated pipe having a helically extending lock seam, comprising: means for simultaneously and continuously feeding forward more than one sheet metal strip in overlying parallel relation to one another, each strip being laterally offset from the other strip a distance which is a small multiple of the thickness of the strips, means adjacent the feeding means for securing the strips together along a line extending lengthwise of the strips to form a multi-layered web; means forward of the securing means for corrugating the web intermediate its side edges; means forward of the corrugating means for forming a male locking hook at one edge of the corrugated web and an open sided female locking hook at the other edge, the male hook being a flange projecting substantially normal to the web in a direction opposite to the direction in which the open side of the female hook faces; a mandrel forward of the hook forming means having a diameter substantially equal to the desired inside diameter of the pipe, the mandrel being disposed at an angle to the direction in which the web is fed, the mandrel being rotatably supported at one end and having means operably connected to the supported end for rotating the mandrel; guide rollers independently supported around the mandrel for holding the web against the mandrel so that it is helically wound thereon; the mandrel being disposed at such an angle to the web as to continuously engage the male hook at one edge of the web within the female hook at the opposite edge of the web while the web is being helically wound on the mandrel; independently supported pinch roll means on either side of the interengaged male and female hooks for continuously squeezing the female hook together against the male hook to form a lock seam; independently supported means for continuously bending over said lock seam, said bending means forcing the outer end of the female hook over against the helically wound web to form the seamed pipe; and means for supporting the formed pipe and the other end of the mandrel and continuously forcing the formed pipe axially from the mandrel.

6. A machine for the continuous formation of sheet metal corrugated laminated pipe having a helically extending double-lock seam comprising: means for continuously feeding forward two strips of sheet metal of substantially equal width from separate reels, the two strips being disposed one on top of the other in parallel with one strip laterally offset from the other a distance which is a small multiple of the thickness of a single strip; means forward of said feeding means for bonding the two strips together along a line extending the length of the strips to form a two-layered web; a plurality of rollers for corrugating the web intermediate its two side edges; roller means for forming a male locking hook along one edge of the corrugated web and an open sided female locking hook along the opposite edge, the male hook being a flange projecting substantially normal to the web in the direction opposite to the direction in which the open side of the female hook faces; a mandrel forward of the hook-forming roller means and having a diameter substantially equal to the desired inside diameter of the pipe, the mandrel being disposed at an angle to the direction in which the web extends and being rotatably supported at one end thereof; means to rotate the mandrel operably connected to the supported end thereof; guide rollers independently supported around the mandrel for guiding the web around the mandrel so that it is helically wound thereon; the mandrel being disposed at such an angle to the web as to engage the male hook along one edge of the web within the female hook along the opposite edge as the web is wound on the mandrel; pinch roll means on either side of the interengaged hook portions for squeezing the female hook into close contact with the male hook to form a lock seam; at least one of said guide rollers being adapted to bend said lock seam against the helically wound web, and at least one of said guide rollers being corrugated to mesh with the corrugations of the helically wound web; and means for rotatably supporting the helically seamed pipe at the other end of the mandrel; said mandrel, said corrugated guide roll and said pinch rolls being driven synchronously with said feeding means and said corrugating rollers for winding the web on the mandrel and for sliding the pipe from the mandrel.

References Cited by the Examiner

UNITED STATES PATENTS

| | | | |
|---|---|---|---|
| 1,159,947 | 11/1915 | Johnson | 29—202.5 |
| 1,580,760 | 4/1926 | Palmer | 29—202.5 X |
| 1,841,300 | 1/1932 | Scarritt | 138—154 |
| 2,316,349 | 4/1943 | McMinn | 138—154 |
| 2,636,541 | 4/1953 | Rutherford | 29—200 X |
| 2,862,469 | 12/1958 | Jensen | 72—49 |
| 3,128,216 | 4/1964 | Reed | 156—184 |
| 3,132,416 | 5/1964 | Hait | 29—429 |
| 3,151,012 | 9/1964 | Bergstrom | 156—184 |

JOHN F. CAMPBELL, *Primary Examiner.*

LAVERNE D. GEIGER, THOMAS H. EAGER,
*Examiners.*

H. K. ARTIS, *Assistant Examiner.*